(12) United States Patent
Wang et al.

(10) Patent No.: US 11,126,220 B2
(45) Date of Patent: Sep. 21, 2021

(54) SYSTEM AND METHOD FOR TIME SYNCHRONIZATION BETWEEN INFORMATION HANDLING SYSTEMS

(71) Applicant: Dell Products L.P., Hopkinton, MA (US)

(72) Inventors: Isaac Q. Wang, Austin, TX (US); Timothy M. Lambert, Austin, TX (US)

(73) Assignee: DELL PRODUCTS L.P., Hopkinton, MA (US)

( * ) Notice: Subject to any disclaimer, the term of this patent is extended or adjusted under 35 U.S.C. 154(b) by 0 days.

(21) Appl. No.: 16/775,963

(22) Filed: Jan. 29, 2020

(65) Prior Publication Data

US 2021/0232176 A1 Jul. 29, 2021

(51) Int. Cl.
*G06F 1/12* (2006.01)
*G06F 13/42* (2006.01)
*G06F 13/36* (2006.01)

(52) U.S. Cl.
CPC .............. *G06F 1/12* (2013.01); *G06F 13/36* (2013.01); *G06F 13/4295* (2013.01); *G06F 2213/0042* (2013.01)

(58) Field of Classification Search
CPC .. G06F 1/12; G06F 3/4295; G06F 2213/0042; G06F 13/36
See application file for complete search history.

(56) References Cited

U.S. PATENT DOCUMENTS

| | | | | |
|---|---|---|---|---|
| 8,898,349 | B1* | 11/2014 | Mondal | G06F 13/385 710/16 |
| 2009/0222685 | A1* | 9/2009 | Foster | G06F 1/12 713/500 |
| 2012/0059965 | A1* | 3/2012 | Foster | G06F 13/4282 710/305 |
| 2012/0066418 | A1* | 3/2012 | Foster | G06F 13/4282 710/61 |
| 2012/0066537 | A1* | 3/2012 | Foster | G06F 13/10 713/400 |
| 2013/0191568 | A1* | 7/2013 | Hershko | G06F 13/4295 710/106 |
| 2014/0013024 | A1* | 1/2014 | Lamm | H01R 13/46 710/313 |
| 2014/0143459 | A1* | 5/2014 | Yang | G06F 13/385 710/60 |
| 2016/0147625 | A1* | 5/2016 | Min | G06F 11/2247 710/104 |
| 2016/0378704 | A1* | 12/2016 | Adamson | G06F 13/385 710/104 |
| 2017/0109302 | A1* | 4/2017 | Wang | G06F 13/20 |

* cited by examiner

Primary Examiner — Raymond N Phan
(74) Attorney, Agent, or Firm — Chamberlain, Hrdlicka, White, Williams & Aughtry (57) ABSTRACT

An information handling system includes a synchronizer and a module identifier. The module identifier identifies a module identification event for a module attached to the information handling system; in response to identifying the module identification event: obtains a module identifier from the module, and makes a determination that the module identifier indicates that the module is a synchronization type of module, and initiates, based on the determination, time synchronization for the information handling system with a second information handling system using the module and the synchronizer.

14 Claims, 6 Drawing Sheets

SYSTEM AND METHOD FOR TIME SYNCHRONIZATION BETWEEN INFORMATION HANDLING SYSTEMS

BACKGROUND

Computing devices may perform services. To provide the services, the computing devices may include hardware components and software components. The software components may utilize the hardware components to provide the services.

SUMMARY

In one aspect, an information handling system in accordance with one or more embodiments of the invention includes a synchronizer and a module identifier. The module identifier identifies a module identification event for a module attached to the information handling system; in response to identifying the module identification event: obtains a module identifier from the module, and makes a determination that the module identifier indicates that the module is a synchronization type of module, and initiates, based on the determination, time synchronization for the information handling system with a second information handling system using the module and the synchronizer.

In one aspect, a method for managing an information handling system in accordance with one or more embodiments of the invention includes identifying a module identification event for a module attached to the information handling system; and in response to identifying the module identification event: obtaining a module identifier from the module, making a determination that the module identifier indicates that the module is a synchronization type of module, and initiating, based on the determination, time synchronization for the information handling system with a second information handling system using the module and a synchronizer of the information handling system.

In one aspect, a non-transitory computer readable medium in accordance with one or more embodiments of the invention includes computer readable program code, which when executed by a computer processor enables the computer processor to perform a method for managing an information handling system. The method includes identifying a module identification event for a module attached to the information handling system; and in response to identifying the module identification event: obtaining a module identifier from the module, making a determination that the module identifier indicates that the module is a synchronization type of module, and initiating, based on the determination, time synchronization for the information handling system with a second information handling system using the module and a synchronizer of the information handling system.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an information handling system in accordance with one or more embodiments of the invention.

FIG. 3.1 shows a diagram of an example system.

FIG. 3.2 shows a diagram of actions and/or interactions between components of the example system of FIG. 3.1 over time.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a device may include a first element labeled as A and a second element labeled as N. This labeling convention means that the device may include any number of the elements. A second device, also labeled as A to N, may also include any number of elements. The number of elements of the first device and the number of elements of the second device may be the same or different.

In general, embodiments of the invention relate to systems, devices, and methods for synchronizing information handling systems (IHSs). An IHS may be a device that provides computer implemented services. To provide computer implemented services, the IHS may use hardware resources such as by executing program code using processors, storing information in memory, communicating with other devices using network adapters, etc.

When any of the aforementioned hardware resources are utilized, the hardware resources may rely on clocks, counters, or other devices that operate using a periodic timing. However, the aforementioned devices may not automatically synchronize their behavior with similar devices used by other IHSs.

Embodiments of the invention may facilitate synchronizing IHSs with each other. Synchronizing IHSs may improve the ability of the IHSs to, for example, perform hyperthreading, virtualization, and/or provide other functionalities.

To synchronize IHSs, the IHSs may distribute a master timing signal among the IHSs. Each of the IHSs may utilize the master timing signal to synchronize with each other.

To distribute the master timing signal among the IHSs, at least a portion of the IHSs may be physically connected to each other in a daisy chain configuration. In other words, many of the IHSs may be connected to (i) an "upstream" IHS from which it obtains the master timing signal via a first cable and (ii) a "downstream" IHS to which it distributes the master timing signal via a second cable.

To efficiently obtain and distribute master timing signals, a synchronization module may be used by an IHS. A synchronization module may be a device adapted to operably connect to a single port of the IHS and provide two outputs, which may be connected, to the respective upstream and downstream IHSs.

The port of the IHS to which the synchronization module may be attached may be a universal serial bus (USB) 3.0 port. At least a portion of the wires of the USB 3.0 port may be repurposed to facilitate (i) identification of the synchronization module, (ii) obtaining of the master timing signal from the upstream IHS, and (iii) providing of the master timing signal to the downstream IHS. A second portion of the wires of the USB 3.0 port may be useable for providing of USB 2.0 connectivity.

By doing so, an IHS that includes a synchronization module in accordance with one or more embodiments of the invention may facilitate efficient distribution of master timing signals and USB connectivity using a single port. Consequently, the time and expense for facilitating distribution of master timing signals may be reduced when compared to using proprietary connectors and cabling while maintaining existing USB functionality.

Figure 11:
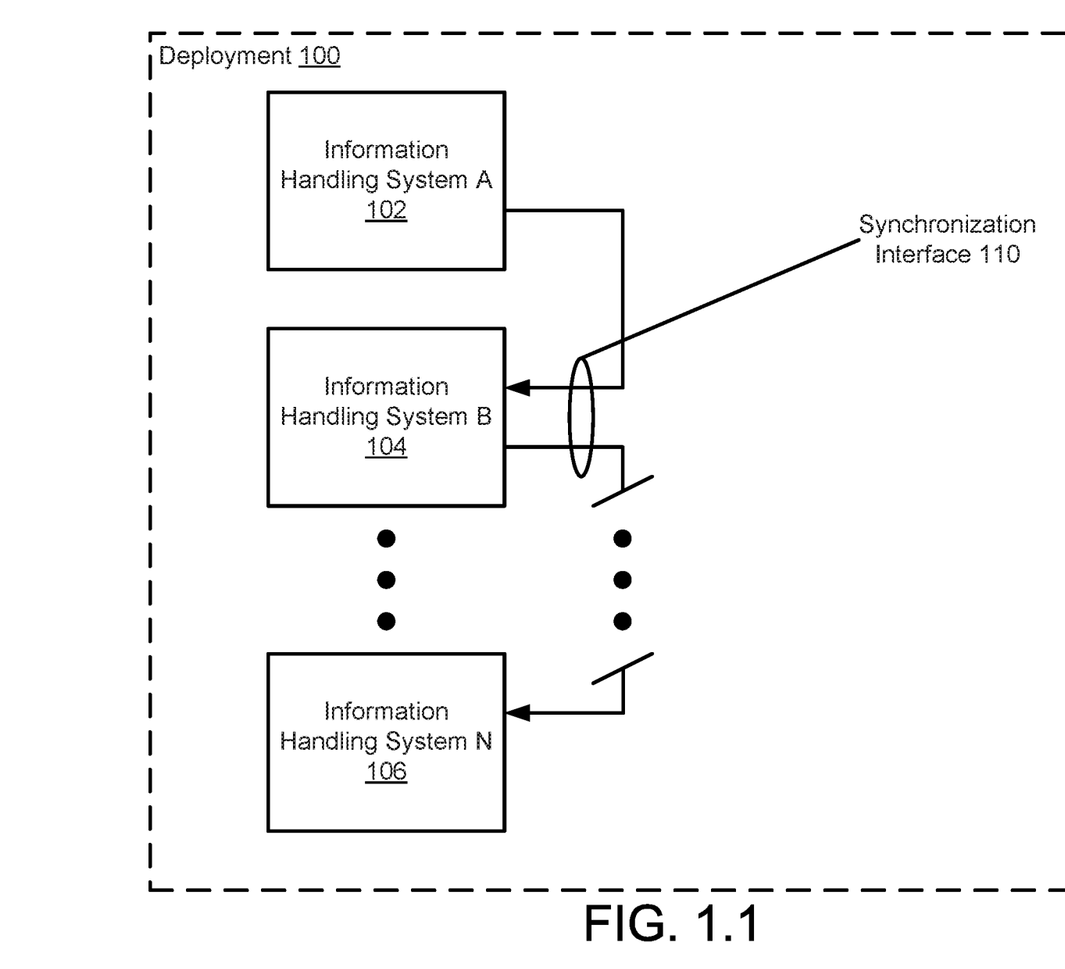

FIG. 1.1 shows a deployment (100) in accordance with one or more embodiments of the invention. The deployment (100) may provide computer implemented services. The computer implemented services may include, for example, database services, data storage services, electronic communications services, and/or other types of services that may be implemented using computing devices.

Figure 4:
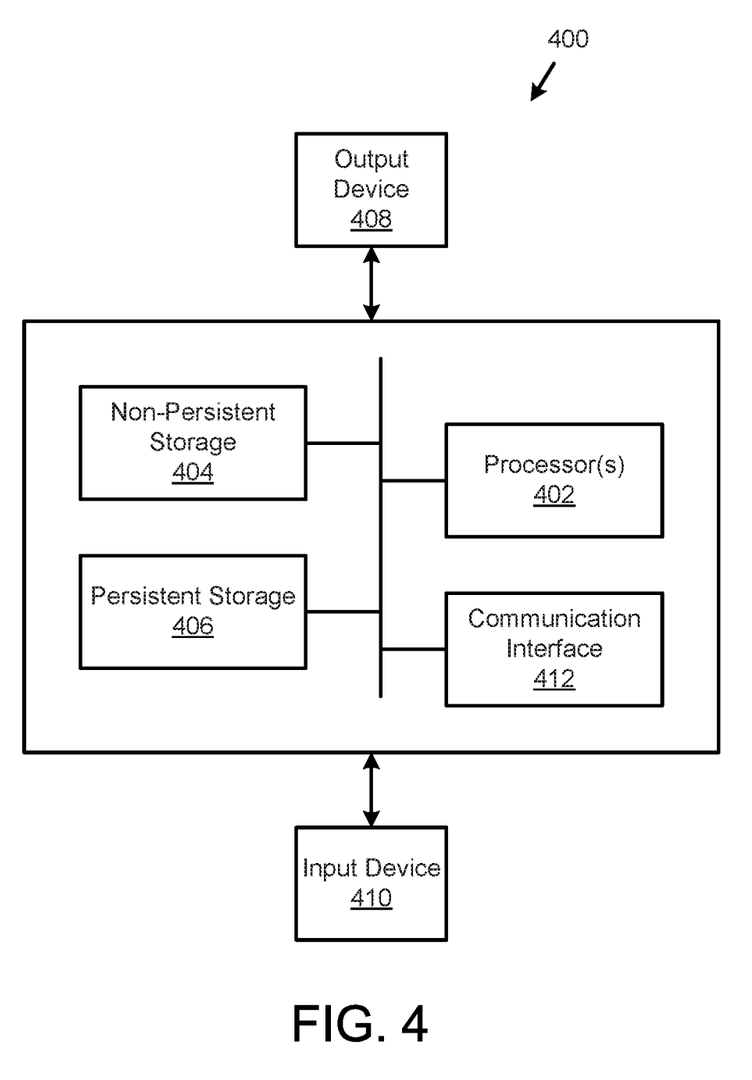
FIG. 4 shows a diagram of a computing device in accordance with one or more embodiments of the invention.

To provide the services, the deployment (100) may include any number of information handle systems (IHSs) (e.g., 102, 104, 106). The IHSs may include computing devices. Refer to FIG. 4 for additional details regarding computing devices.

The IHSs may host applications that provide the computer implemented services. Different IHSs may host similar and/or different applications. Consequently, any of the IHSs may provide similar and/or different computer implemented services.

Some of the IHSs may cooperate when providing computer implemented services. For example, multiple IHSs may each host an instance of an application. The instances of the applications may coordinate with one another to provide computer implemented services. For example, different instances of the application hosted by different IHSs may provide the same service to different clients (e.g., other devices that utilize the services provided by the IHSs), the instances of the applications may share information with each other to maintain a consistency of provided services, the instances of the applications may communicate with each other for command and coordination purposes, etc.

When providing computer implemented services, the applications may utilize processing resources provided by the computing devices of the IHSs (e.g., 102, 104, 106). The processing resources may be used to facilitate execution of the applications. The processing resources may be provided by processors of the computing devices.

The processors and other devices of the IHSs may utilize clocks to perform computations and/or perform other actions. Due to differences between the IHSs, the clocks used by the devices of the IHSs may be and/or may become out of sync with one another.

Embodiments of the invention may provide method, devices, and/or systems for distributing signals between IHSs that may be used for synchronization purposes. For example, the distributed signals may be used to synchronize counters used during the operation of the processors and/or other hardware devices of the IHSs. By doing so, any number of IHSs may be time synchronized with each other. Such synchronization may improve, for example, the ability of the IHSs to perform hyperthreading and/or virtualization.

To facilitate distribution of signals for synchronization purposes, the IHSs may be operably connected to each other via synchronization interfaces (e.g., 110). A synchronization interface (e.g., 110) may include cables that physically interconnect the IHSs.

In one or more embodiments of the invention, the IHSs are connected in a daisy chain fashion. For example, one of the IHSs (e.g., 102) may maintain and provide a master timing signal to a second IHS (e.g., 104). The second IHS may distribute the timing signal to a third IHS and the process may repeat until the master timing signal is distributed to any number of IHSs.

The master timing signal may be of any form and include any type of information that may enable the IHSs to synchronize with each other. For example, the master timing signal may include a clock reference that when provided to a clock enables the clock to synchronize itself with a clock from which the clock reference was generated.

In one or more embodiments of the invention, the master timing signal is distributed to the IHSs using universal serial bus (USB) cables. For example, information handling system A (102) may be physically connected to information handling system B (104) via a USB cable. The USB cable may be compliant with the 3.0 specification (referred to herein as a USB 3.0 cable). Depending on the types of ports available to IHSs, the USB 3.0 cables may be terminated in normal (e.g., type A) or mini versions (e.g., type B) of the connector form factor.

In one or more embodiments of the invention, the master timing signal is not compliant with the USB communication protocol. Rather, the wires of the USB 3.0 cables may be repurposed for distributing the master timing signal. As will be discussed below, only a portion of the wires of the USB 3.0 cables may be repurposed for distributing the master timing signals. Consequently, a divider may be used to enable a portion of the wires to be used for USB communication purposes while a second portion are used for master timing signal distribution purposes.

Figure 12:
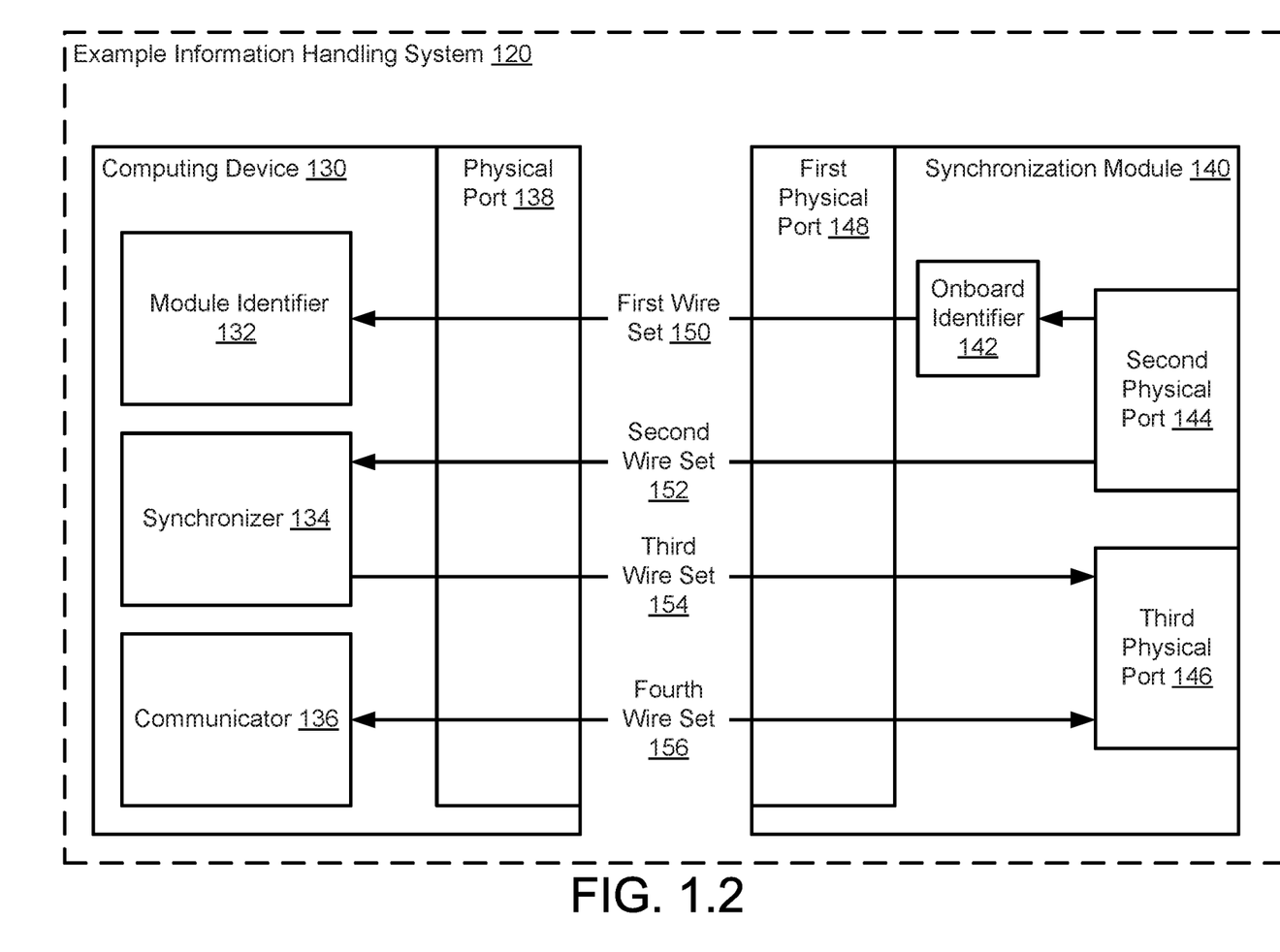

To facilitate using the USB 3.0 cables for purposes of distributing the master timing signal, each of the IHSs may utilize a synchronization module. A synchronization module may be a physical device that is designed to physically connect to a USB 3.0 port of a computing device of an IHS and enable the USB 3.0 cable carrying the master timing signal to be provided to the computing device. The synchronization module may facilitate reuse of a portion of the wires of the USB 3.0 cable for master timing signal distribution purposes while enable a second portion of the wires of the USB 3.0 cable to be used for USB communications purposes. For additional details regarding providing the master timing signal to the computing device while enabling USB communications, refer to FIG. 1.2.

By distributing master timing signals using repurposed USB 3.0 cables and ports, embodiments of the invention may (i) enable the IHSs to be time synchronized with each other using inexpensive components, (ii) enable USB functionality to be utilized, and (iii) provide a module-based approach to incremental enhancement of the functionality of IHSs. New functionality may be added to IHSs by addition of a synchronization module in a manner that enables existing functionality (e.g., USB communications) to be maintained.

While the IHSs are illustrated in FIG. 1.1 as being operably connected using a specific connection type and cabling topology, the IHSs may be operably connected to each other using different types of cabling and cabling topology without departing from the invention. Additionally, the IHSs may also be operably connected to each other and/or other devices via any combination of wired and/or wireless networks.

As discussed above, IHSs may distribute master timing signals amongst themselves for synchronization purposes when providing computer implemented services. FIG. 1.2 shows a diagram of an example IHS (120) in accordance with one or more embodiments of the invention. The IHSs illustrated in FIG. 1.1 may be similar to the example IHS (120).

To provide computer implemented services, the IHS may include a computing device (130). The computing device (130) may be a physical device that includes hardware components and functionality as described with respect to FIG. 4, discussed below. The computing device (130) may host applications that provide the computer implemented services, discussed above.

In addition, the computing device (130) may include a module identifier (132), a synchronizer (134), a communicator (136), and a physical port (138). Each of these components of the example IHS (120) is discussed below.

The module identifier (132) may provide module identification services. Module identification services may include (i) identifying module identification events, (ii) obtaining identifiers of modules in response to identifying module identification events, (iii) identifying types of the modules using the identifiers, and/or (iv) taking action based on the identified types of the modules. By doing so, the module identifier (132) may manage modules physically attached to physical ports (e.g., 138) of the example IHS (120).

To identify module identification events, the module identifier (132) may (i) monitor the operation of the example IHS (120) and (ii) monitor the connectivity of the physical ports of the example IHS (120). For example, the module identifier (132) may identify when the example IHS (120) has been restarted and, upon being restarted, automatically check to determine whether any new devices have been physically connected to the physical ports of the computing device (130). In another example, the module identifier (132) may monitor the connectivity of the physical ports to ascertain whether a new module (or other type of device) has been attached to the physical ports of the example IHS (120).

When a module identification event has occurred, the module identifier (132) may attempt to obtain an identifier from any device attached to the physical port (138). Any module (e.g., 140) that attaches to the physical port (138) may be adapted to provide an identifier to the module identifier (132) after attaching to the computing device (130). As will be discussed in greater detail below, the module identifier (132) may be connected to a portion of the physical port (138) that has been repurposed from its original intended purposes.

Specifically, a pin of the physical port (138) that is purposed for facilitating transmission of USB 3.0 compliant communications may be repurposed for obtaining of identifiers from modules. When a module is attached to the physical port (138), a first wire set (150) of the physical port (138) may be repurposed for transmission of an identifier of the module to the module identifier (132). The first wire set (150) may only include a single, repurposed wire that was originally purposed for facilitating USB 3.0 communications.

After a type of the module is identified, the module identifier (132) may take action based on the identified type. For example, the module identifier may notify the synchronizer (134) that a synchronization module (140) has been attached when the type of the module is a synchronization type. The module identifier (132) may perform different types of actions depending on the type of the module.

In one or more embodiments of the invention, the module identifier (132) is implemented using a hardware device including circuitry. The hardware device may be, for example, a digital signal processor, a field programmable gate array, or an application specific integrated circuit. The module identifier (132) may be implemented using other types of hardware devices without departing from the invention.

In one or more embodiments of the invention, the module identifier (132) is implemented using computing code stored on a persistent storage (e.g., 406, FIG. 4) that when executed by a processor (e.g., 402, FIG. 4) performs the functionality of the module identifier (132). The processor may be a hardware processor (e.g., 402, FIG. 4) including circuitry such as, for example, a central processing unit or a microcontroller. The processor may be other types of hardware devices for processing digital information without departing from the invention.

The synchronizer (134) may provide synchronization services. Synchronization services may include (i) obtaining a master timing signal, (ii) distributing the master timing signal to another information handling system, and/or (iii) using the master timing signal to synchronize itself with a second IHS.

To obtain the master timing signal, the synchronizer (134) may utilize at least two repurposed pins of the physical port (138). The at least two repurposed pins of the physical port (138) may be a part of a second wire set (152) which operably connects the synchronizer (134) to a synchronizer of a second IHS that is providing the master timing signal (except when the synchronizer is maintaining and providing a master timing signal, in such a scenario the synchronizer (134) may only provide the master timing signal to other entities).

To distribute the master timing signal to another IHS, the synchronizer (134) may utilize at least two repurposed pins of the physical port (138) to transmit the master timing signal to the another IHS. The at least two repurposed pins of the physical port (138) may be a part of a third wire set (154) which operably connects the synchronizer (134) to a synchronizer of the another IHS.

In one or more embodiments of the invention, the synchronizer (134) is implemented using a hardware device including circuitry. The hardware device may be, for example, a digital signal processor, a field programmable gate array, a clock synthesizer, a clock buffer, a clock generator, or an application specific integrated circuit. The synchronizer (134) may be implemented using other types of hardware devices without departing from the invention.

In one or more embodiments of the invention, the synchronizer (134) is implemented using computing code stored on a persistent storage (e.g., 406, FIG. 4) that when executed by a processor (e.g., 402, FIG. 4) performs the functionality of the synchronizer (134). The processor may be a hardware processor (e.g., 402, FIG. 4) including circuitry such as, for example, a central processing unit or a microcontroller. The processor may be other types of hardware devices for processing digital information without departing from the invention.

The communicator (136) may provide communication services. Specifically, the communicator (136) may provide USB communication services. The USB communication services provided by the communicator (136) may be compliant with the 2.0 specification. Consequently, to provide the USB communication services, the communicator (136) may only need to utilize a limited number of pins of a USB 3.0 port.

For example, the USB 2.0 specification may only require 4 wires for transmission of USB 2.0 communications. In contrast, the USB 3.0 specification includes both the 4 wires required for USB 2.0 communications and may further include 4 additional wires used for differential signaling as part of USB 3.0 communications and/or additional wires for grounding purposes.

To provide communication services, the communicator (136) may use 4 pins of the physical port (138). Specifically, the 4 pins corresponding to those used for USB 2.0 communications. In contrast, the pins used by the module identifier and the synchronizer may correspond to pins used for USB 3.0 communications. The 4 pins of the physical port (138) may be a part of a fourth wire set (156) which operably connects the communicator (136) to a corresponding communicator (or other communications device) of a second IHS or another type of device with which the computing device (130) is to communicate via USB communications.

In one or more embodiments of the invention, the communicator (136) is implemented using a hardware device including circuitry. The hardware device may be, for example, a digital signal processor, a field programmable gate array, or an application specific integrated circuit. The communicator (136) may be implemented using other types of hardware devices without departing from the invention.

In one or more embodiments of the invention, the communicator (136) is implemented using computing code stored on a persistent storage (e.g., 406, FIG. 4) that when executed by a processor (e.g., 402, FIG. 4) performs the functionality of the communicator (136). The processor may be a hardware processor (e.g., 402, FIG. 4) including circuitry such as, for example, a central processing unit or a microcontroller. The processor may be other types of hardware devices for processing digital information without departing from the invention.

Figure 2:
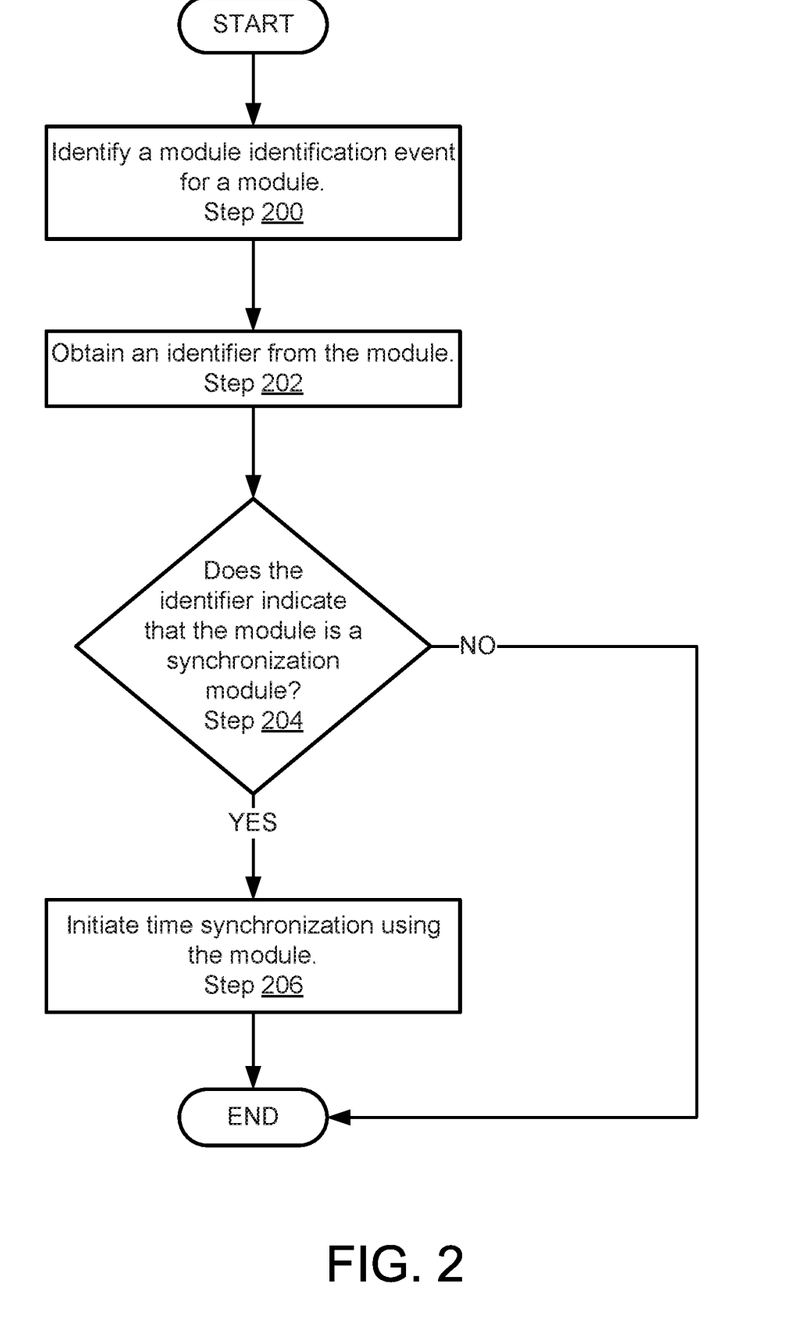
FIG. 2 shows a flow chart of a method of synchronizing an information handling system in accordance with one or more embodiments of the invention.

To provide the above noted functionality of the module identifier (132), the synchronizer (134), and/or the communicator (136), any of the aforementioned components of the computing device (130) may perform all, or a portion, of the methods illustrated in FIG. 2.

The physical port (138) may be a physical device that enables connectors to physically attach to it. For example, the physical port (138) may be a USB 3.0 compliant connector. The connector may include 9 pins that are adapted to provide USB 3.0 compliant communications. In other words, adapted to connect to corresponding wires of a USB 3.0 cable.

As discussed above, the 5 pins of the connector adapted to provide USB 3.0 communications (in contrast to the 4 pins adapted for USB 2.0 communications) may be repurposed and operably connected to the module identifier (132) and the synchronizer (134). Specifically, (i) the USB 3.0 ground pin may be connected to the module identifier (132) (e.g., to enable an identifier of the module to be provided to the module identifier (132)), (ii) the 2 pins used for reception of USB 3.0 signals may be connected to the synchronizer (134) (e.g., to enable the synchronizer to obtain the master timing signal from other IHSs), and (iii) the 2 pins used for transmission of USB 3.0 signals may be connected to the synchronizer (134) (e.g., to enable the synchronizer to provide the master timing signal to other IHSs). By doing so, the pins may be repurposed for purposes other than USB communications. Consequently, non-USB 3.0 compliant communications may be sent over the pins and corresponding wires that are adapted for USB 3.0 communications.

To enable the computing device (130) to synchronize with other IHSs, a synchronization module (140) may be physically attached to the physical port (138) of the computing device (130).

The synchronization module (140) may facilitate synchronizations to be performed while also enabling USB 2.0 communications to be performed. To do so, the synchronization module may (i) provide identification information to the computing device (130) that enables the computing device (130) to identify it when the synchronization module (140) is attached to the physical port (138) and (ii) physically divide the wire sets (150, 152, 154, 156) across two physical ports (e.g., 144, 146) to enable two cables to be connected to different portions of the wire sets (150, 152, 154, 156). By doing so, the two cables may be utilized to connect the example IHS to two different IHSs in a daisy chain manner while enabling USB communications to be performed.

To provide the above functionality, the synchronization module may include three physical ports (148, 144, 146) and an onboard Identifier (142). Each of these components is discussed below.

The first physical port (148) may include a connector adapted to physically attach to a connector of the first physical port (148). In other words, the connector of the physical port (138) may be a jack (e.g., USB 3.0 type A) and the connector of the first physical port (148) may be a plug (e.g., USB 3.0 type B or a mini variant). As noted above, the pins of the connector of the physical port (138) may be at least partially repurposed (e.g., for purposes other than USB communications). Consequently, when the connector of the first physical port (148) is attached to the physical port (138), the pins of the connector of the first physical port (148) may be similarly repurposed.

The pins of the first physical port (148) may be connected to pins of a second physical port (144) and a third physical port (146) of the synchronization module (140). The connections may be made by, for example, using a wire harness, circuit card, or another type of interconnect form factor.

The second physical port (144) and the third physical port (146) may include connectors adapted for USB 3.0 communications. In other words, that include pins that are adapted (e.g., positioned, sized, etc.) for USB 3.0 communications.

For example, the connector of the second physical port (144) may be implemented using a USB 3.0 mini type-B plug and the third physical port (146) may be implemented using a USB 3.0 type-A plug. By doing so, USB 3.0 cables may be operably connected to each of the aforementioned ports in a manner that facilitates daisy chaining the example IHS with at least 2 other IHSs.

For example, the second wire set (152) may be connected to the USB 3.0 reception pins on the USB 3.0 mini type-B plug. Similarly, the third wire set (154) may be connected to the USB 3.0 transmission pins on the USB 3.0 type-A plug. Consequently, a master timing signal may be obtained from an "upstream" IHS via the second physical port (144) and the master timing signal may be provided to a "downstream" IHS via the third physical port (146).

To also enable USB 2.0 communications, the fourth wire set (156) may be connected to the USB 2.0 pins of the third physical port (146). Consequently, when a USB 3.0 cable is attached to the third physical port (146), a splitter may be used to enable the communicator (136) to be connected to other devices using a first portion of the split while the second portion of the split may be used to enable the synchronizer (134) to be connected to a "downstream" IHS.

The onboard Identifier (142) may be a physical device that stores and provides an identifier to the module identifier (132) when the synchronization module (140) is connected to the computing device (130). For example, the onboard Identifier (142) may be a programmable logic device that stores the identifier. When the synchronization module (140) is disposed in the physical port (138), the programmable logic device may obtain power from the computing device (130), provide the identifier via the first wire set (150), and/or perform other actions.

The identifier provide by the onboard Identifier (142) may include any type and quantity of information that may be used to identify a type of the synchronization module (140). For example, the identifier may be a name of the type (e.g., "synchronization") of module.

In addition to the aforementioned components, the synchronization module (140) may include a housing or other structural elements used to enclose all, or a portion, of the ports and/or the onboard identifier (142).

While the example IHS (120) has been illustrated and described as including a limited number of specific component, an IHS in accordance with embodiments of the invention may include additional, fewer, and/or different components without departing from the invention.

As discussed above, the system of FIG. 1 may facilitate synchronization between IHSs. FIG. 2 shows a method that may be performed by components of the system of FIG. 1 to synchronize IHSs.

FIG. 2 shows a flowchart of a method in accordance with one or more embodiments of the invention. The method depicted in FIG. 2 may be used to synchronize an IHS in accordance with one or more embodiments of the invention. The method shown in FIG. 2 may be performed by, for example, an IHS (e.g., 102, FIG. 1).

While FIG. 2 is illustrated as a series of steps, any of the steps may be omitted, performed in a different order, additional steps may be included, and/or any or all of the steps may be performed in a parallel and/or partially overlapping manner without departing from the invention.

In step 200, a module identification event for a module is identified. The module identification event may be identified by a module identifier. The identification may be made, for example, by monitoring a status of a port of a computing device in which the module may be disposed.

The module identification event may be, for example, a start of the computing device, a reboot of the computing device, attachment of an unknown module in a port, the existence of an unknown module attached to a port, etc. The module identification event may be other types of events without departing from the invention.

In step 202, an identifier is obtained from the module. The identifier may be obtained from an onboard identifier of the module. The identifier may specify a type of the module.

The identifier may be obtained using a pin of a USB 3.0 port that has been repurposed. The identifier may be obtained using a communication protocol that is not compliant with USB communications.

In step 204, it is determined whether the identifier indicates that the module is a synchronization module. The determination may be made based on the identifier. As noted above, the identifier may specify the type of the module.

If it is determined that the module is a synchronization module, then the method may proceed to step 206. If it is determined that the module is not a synchronization module, the method may end following step 204.

In step 206, timing synchronization is initiated using the module.

Timing synchronization may be initiated by obtaining a master timing signal using the module. The module may provide the master timing signal to the computing device using two pins of a USB 3.0 port that have been repurposed. The master timing signal may be obtained using a communication protocol that is not compliant with USB communications.

Timing synchronization may be further initiated by providing the master timing signal to a second IHS using the module. The module may provide the master timing signal to the second IHS using two pins of a USB 3.0 port that have been repurposed. The master timing signal may be provided using a communication protocol that is not compliant with USB communications.

The timing synchronization may be performed while USB communications are being performed using the USB 3.0 port through which non-compliant USB communications are being transmitted for synchronization purposes.

The method may end following step 206.

Using the method illustrated in FIG. 2, an IHS in accordance with embodiments of the invention may synchronize with other IHSs using a USB port through which USB communications are being concurrently performed.

Figure 31:
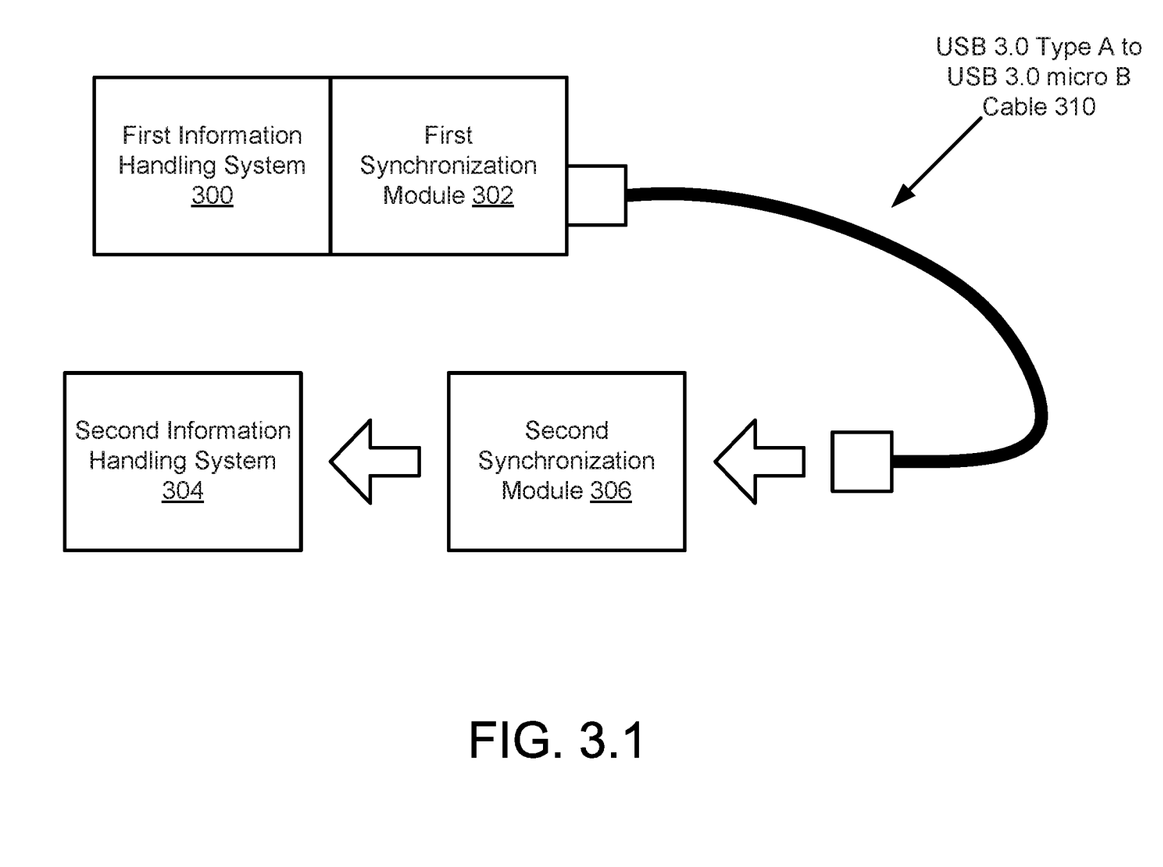
Figure 32:
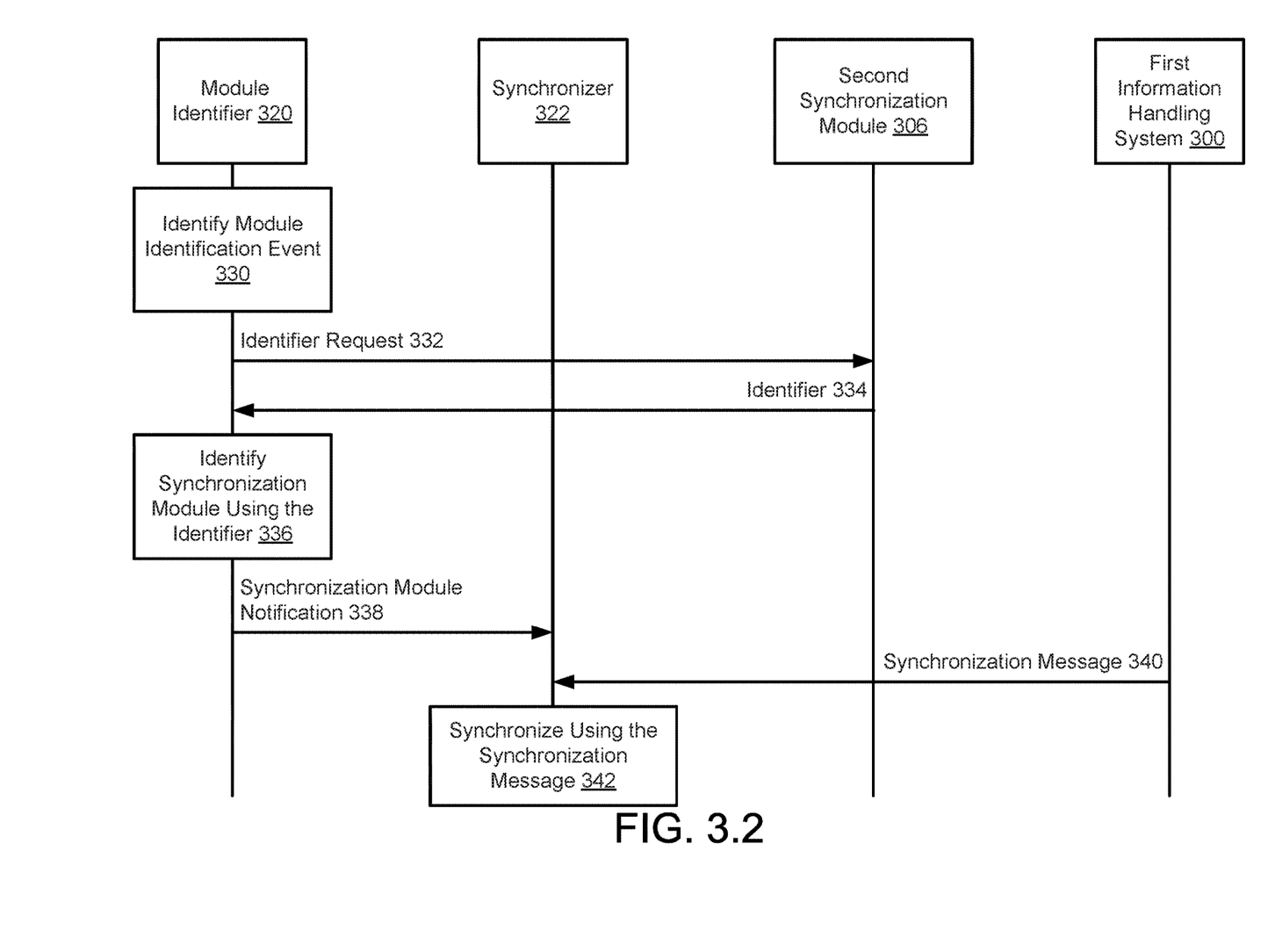

To further clarify embodiments of the invention, a non-limiting example is provided in FIGS. 3.1-3.2. FIG. 3.1 shows a system similar to that illustrated in FIG. 1.1. FIG. 3.2 illustrates interactions between components and/or actions performed by the components of the system of FIG. 3.1 over time.

For the sake of brevity, only a limited number of components of the system of FIG. 1.1 are illustrated in each of FIGS. 3.1-3.2.

Beginning of Example

Consider a scenario as illustrated in FIG. 3.1 in which a first IHS (300) is providing computer implemented services. Due to the load on the first IHS (300), a second IHS (304) is added to a deployment in which the first IHS (300) resides. To facilitate synchronization between the first IHS (300) and the second IHS (304), a first synchronization module (302) is attached to a port of the first IHS (300).

A second synchronization module (306) is then added to the second IHS (304) and a USB 3.0 type A to micro type B cable (310) is used to interconnect the first synchronization module (302) and the second synchronization module (306), as indicated by the large arrows between the second IHS (304), the second synchronization module (306), and the cable (310).

Turning to FIG. 3.2, the aforementioned figures illustrates interactions between and/or actions performed by components of the system of FIG. 3.1. In the figure, the relative occurrence in time of the interactions progresses from the top of the figure (i.e., earlier in time) to the bottom of the figure (i.e., later in time). In other words, element 330 indicates the first interaction that occurs in time while element 342 indicates the last interaction that occurs.

As seen in FIG. 3.2, after the second synchronization module (306) is connected to the second IHS, the module identifier (320) of the second IHS identifies that a module identification event has occurred. Specifically, the module identifier (320) determines that a module has been attached to a port of the second IHS, but the identity of the module is unknown.

In response to identifying the module identification event, the module identifier (320) sends an identifier request (332) to the second synchronization module (306). The identifier request (332) requests that the second synchronization module (306) to provide its identifier to the module identifier (320).

In response to receiving the identifier request (332), the second synchronization module (306) provides its identifier (334) to the module identifier (320). While illustrated in FIG. 3.2 as providing the identifier (334) in response to a request, the second synchronization module (306) may provide its identifier (334) for other reasons.

For example, the second synchronization module (306) may provide its identifier by default whenever it is powered on. In another example, the second synchronization module (306) may provide its identifier whenever it identifies that it has been attached to another device. Thus, the module identifier (320) may not send a request (e.g., 332) at all. Rather, the module identifier (320) may merely wait for identifiers to be provided to it rather than actively attempting to obtain identifiers of devices.

Once the identifier is obtained, the module identifier (320) identifies the synchronization module using the identifier (336). Thus, the module identifier (320) is now aware that a synchronization module has attached to port of the second IHS to which a synchronizer of the second IHS is also attached.

In response to identifying that the module is a synchronization module, the module identifier (320) sends a synchronization module notification (338) to the synchronizer (322) to notify the synchronizer (322) that it is appropriately attached to another device to perform its function.

In response to obtaining the synchronization module notification (338), the synchronizer (322) obtains a synchronization message (340) from the first IHS (300). Specifically, the synchronizer (322) begins monitoring for a master timing signal via the port to which the second synchronization module (306) is attached.

After obtaining the synchronization message (340), the synchronizer (322) synchronizes using the synchronization message (342). Specifically, the synchronizer uses the synchronization message (340) to align the timing of, for example, counters, clocks, and/or other similar types of functions of the second IHS with similar functions being performed by the first IHS (300). By doing so, the first IHS (300) may be synchronized with the second IHS.

While not illustrated in FIGS. 3.1 and 3.2, after the synchronizer (322) synchronizes using the synchronization message (342), the synchronizer may output a second synchronization message to a second synchronizer of another IHS. By doing so, the other IHS may also be synchronized with the first IHS (300) and the second IHS (304). In this manner, any number of IHSs may be daisy chained together to enable all of them to be synchronized with each other.

End of Example

Thus, as illustrated in FIGS. 3.1-3.2, embodiments of the invention may enable multiple IHSs to be synchronized with one another.

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

Embodiments of the invention may provide a system for synchronizing multiple IHSs with each other. By synchronizing the IHSs with one another, the IHSs may be better able to provide computer implemented services. For example, the IHSs may be better able to perform hyper-threading or virtualization.

To facilitate synchronization of IHSs, embodiments of the invention may provide a method and system that enables multiple IHSs to efficiently distribute a master timing signal. To distribute the master timing system, one or more synchronization modules may be used to repurpose wires connections of a USB connector for distribution of the master timing signal. The USB connector may be repurposes by utilizing the pins dedicated to USB 3.0 functionality for other purposes while retaining the use of the pins dedicated to USB 2.0 functionality. By doing so, embodiments of the invention may provide a computing device with the ability to both communicate with other devices via the USB 2.0 standard while distributing master timing signals among any number of IHSS devices. By doing so, the limited resources of the computing device may be efficiently marshalled to perform additional functionality beyond its intended capabilities.

Thus, embodiments of the invention may address the problems of limited computing resources in a system.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. An information handling system, comprising:
a synchronizer; and
a module identifier programmed to:
identify a module identification event for a module attached to the information handling system;
in response to identifying the module identification event:
obtain a module identifier from the module, and
make a determination that the module identifier indicates that the module is a synchronization type of module, and
initiate, based on the determination, time synchronization for the information handling system with a second information handling system using the module and the synchronizer,
wherein initiating time synchronization comprises:
obtaining, using a wire set of a universal serial bus (USB) port and the synchronizer, a synchronization signal from the second information handling system, wherein the wire set is operably connected to a second synchronizer of the second information handling system.

2. The information handling system of claim 1, wherein the synchronization signal is not compliant with a universal serial bus protocol implemented by the USB port.

3. The information handling system of claim 1, wherein the synchronizer comprises a clock generator.

4. The information handling system of claim 3, wherein the clock generator is adapted to be used by a general purpose processor of the information handling system that is adapted to execute applications hosted by the information handling system.

5. The information handling system of claim 3, wherein performing time synchronization synchronizes the clock generator with a second clock generator of the second information handling system.

6. A method for managing an information handling system, comprising:
identifying a module identification event for a module attached to the information handling system; and
in response to identifying the module identification event:
obtaining a module identifier from the module,
making a determination that the module identifier indicates that the module is a synchronization type of module, and
initiating, based on the determination, time synchronization for the information handling system with a second information handling system using the module and a synchronizer of the information handling system,
wherein initiating time synchronization comprises:
obtaining, using a wire set of a universal serial bus (USB) port and the synchronizer, a synchronization signal from the second information handling system, wherein the wire set is operably connected to a second synchronizer of the second information handling system.

7. The method of claim 6, wherein the synchronization signal is not compliant with a universal serial bus protocol implemented by the USB port.

8. The method of claim 6, wherein the synchronizer comprises a clock generator.

9. The method of claim 8, wherein the clock generator is adapted to be used by a general purpose processor of the information handling system that is adapted to execute applications hosted by the information handling system.

10. The method of claim 8, wherein performing time synchronization synchronizes the clock generator with a second clock generator of the second information handling system.

11. A non-transitory computer readable medium comprising computer readable program code, which when executed by a computer processor enables the computer processor to perform a method for managing an information handling system, the method comprising:
identifying a module identification event for a module attached to the information handling system; and
in response to identifying the module identification event:
obtaining a module identifier from the module,
making a determination that the module identifier indicates that the module is a synchronization type of module, and
initiating, based on the determination, time synchronization for the information handling system with a second information handling system using the module and a synchronizer of the information handling system,
wherein initiating time synchronization comprises:
obtaining, using a wire set of a universal serial bus (USB) port and the synchronizer, a synchronization signal from the second information handling system, the wire set is operably connected to a second synchronizer of the second information handling system.

12. The non-transitory computer readable medium of claim 11, wherein the synchronization signal is not compliant with a universal serial bus protocol implemented by the USB port.

13. The non-transitory computer readable medium of claim 11, wherein the synchronizer comprises a clock generator.

14. The non-transitory computer readable medium of claim 13, wherein the clock generator is adapted to be used by a general purpose processor of the information handling system that is adapted to execute applications hosted by the information handling system.

* * * * *